United States Patent [19]

Nolte et al.

[11] 4,068,899

[45] Jan. 17, 1978

[54] BRAKING SYSTEMS

[75] Inventors: Gert Nolte, Gehrden; Wolfgang Dittberner, Hannover, both of Germany

[73] Assignee: Massey-Ferguson Services N.V., Curacao, Netherlands Antilles

[21] Appl. No.: 771,125

[22] Filed: Feb. 22, 1977

[30] Foreign Application Priority Data

Feb. 25, 1976 United Kingdom ............... 07336/76

[51] Int. Cl.² ............................................. B60T 11/10
[52] U.S. Cl. ..................................... 303/6 A; 303/15; 303/16; 303/52
[58] Field of Search ................. 303/6 A, 6 M, 13, 15, 303/16, 40, 52, 2; 180/82 B

[56] References Cited

U.S. PATENT DOCUMENTS

| | | | |
|---|---|---|---|
| 3,219,395 | 11/1965 | Schwartz | 303/40 X |
| 3,504,946 | 4/1970 | Valentine et al. | 303/13 X |
| 3,565,220 | 2/1971 | Lammers et al. | 192/4 A |

*Primary Examiner*—George E. A. Halvosa
*Attorney, Agent, or Firm*—Thomas P. Lewandowski

[57] ABSTRACT

Braking system, primarily for wheeled excavators, having a first hydropneumatic brake acting on all wheels and a second auxiliary brake acting on the transmission, a first actuating device to operate the first brake when driving on the road and a second actuating device to operate first and second brakes when the excavator is stationary and working on site, the second actuating device being arranged so that on its operation both brakes are applied simultaneously.

19 Claims, 2 Drawing Figures

BRAKING SYSTEMS

This invention relates to braking systems for vehicles and is particularly concerned with vehicles that perform operations in a fixed location but are required to move between locations under their own power.

Such a vehicle is a wheeled excavator. Such machines are provided with a conventional braking system for the road wheels. However, they are further required to have an auxiliary brake which operates both as an emergency brake and also as an additional brake for use during working.

With the above vehicles it is desirable that the vehicle operator should be presented with a minimum of controls to operate the braking system.

It is an object of the present invention to provide a braking system to meet the above requirement whilst minimising the number of controls required.

According to the present invention there is a fluid pressure operated braking system comprising first and second braking circuits operable upon respective brakes, a first valve movable between first and second operating positions and a second valve movable between first and second positions, wherein the first valve controls movement of the second valve between first and second positions, and in the second position of the second valve, controls supply of fluid pressure to the first braking circuit independently of the second braking circuit and wherein the second valve controls supply of fluid pressure to first and second brake circuits.

Also in accordance with the invention, a third valve is movable between first and second positions to control supply of fluid pressure to the second brake circuit and movement of the third valve is effected in response to movement of the second valve.

The arrangement is such that when the first, second and third valves are each in the first position, the brakes operable by the first and second braking circuits are applied and when the second valve is in the second position, brakes operable by the second braking circuit are released, and movement of the first valve selectively applies or releases the brakes operable by the first braking circuit.

An embodiment of the present invention will now be described by way of example only with reference to the accompanying drawings in which.

Figure 1:
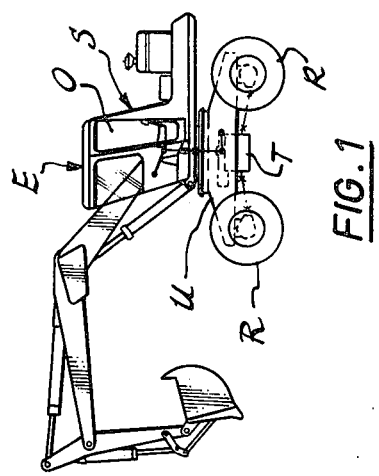
FIG. 1 is a side elevation of a wheeled excavator.

Referring now to the drawings an excavator E is provided with a super structure S having an operators station O, and an undercarriage U having a transmission T and road wheels R. The super structure S is rotatable on the undercarriage U.

Figure 2:
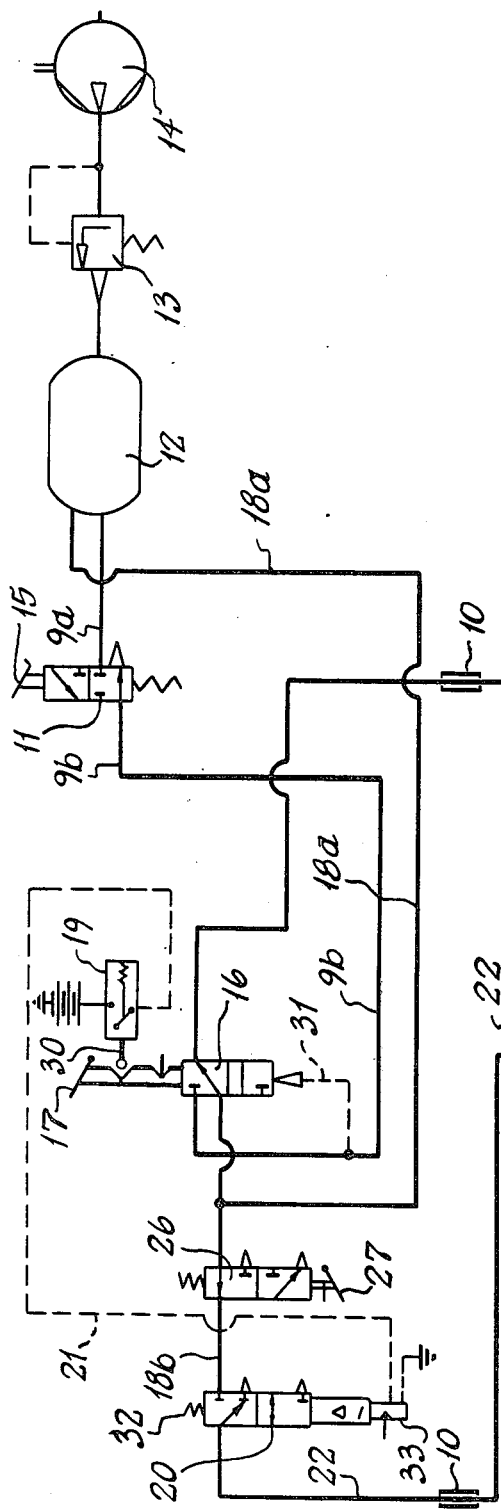
FIG. 2 is a diagrammatic representation of a braking system of the vehicle of FIG. 1.

Referring now to FIG. 2 each of the wheels R is provided with a brake assembly 1.

The brake assembly may be of any convenient form in which the brake is operated by application of fluid pressure and as such will not be described further.

Brake assemblies 1 on the same axle are interconnected by a fluid conduit 3 and the two axles interconnected by a fluid conduit 4.

An actuator comprising a master cylinder 5 is connected in the conduit 4 and includes a piston assembly 8 dividing the master cylinder 5 into a pair of chambers 6, 7.

The piston assembly 8 is biased by a spring 28 so as to reduce the volume of the chamber 6 to a minimum. The chamber 7 is hydraulically connected the conduit 4 and the chamber 6 is connected to an air conduit 9c. In the preferred embodiment the conduits 3, 4 are used to convey an incompressible liquid and the remainder of the conduits are used to convey air. Application of a positive air pressure to the chamber 6 will move the piston assembly 8 against the bias of the spring 28 causing the fluid in the conduits 3, 4 to operate the brake assemblies 1.

The air system comprises a pump 14 protected by a relief valve 13 and supplying a reservoir 12 to which a pair of conduits 9a, 18a are connected. The conduit 9a is connected to a conduit 9b through a two position 3 port valve 11. In the normal position as shown flow from the conduit 9a to conduit 9b is prevented and the conduit 9b is vented to the atmosphere. In its other position the valve 11 connects the conduit 9a to 9b and flow to the atmosphere is prevented. A pedal 15 is provided to move the valve 11 from its normal position to its other position and a spring 29 is provided to return it to its normal position.

Conduit 9b is connected to conduit 9c through a 3 port two position valve 16 which also controls flow between the conduit 18a and the conduit 9c. The valve 16 is movable by a pedal assembly 17 and is provided with a detent 30 to hold it in either of its positions. In the normal position as drawn the conduit 18a is connected to the conduit 9c and flow through the conduit 9b is prevented. With the valve 16 moved to its other position the connections are reversed so that conduits 9b and 9c are connected and flow through conduit 18a is prevented. A pilot line 31 is connected between the conduit 9b and the valve 16 so that pressurisation of conduit 9b will move the valve 16 to the position in which conduits 9b and 9c are connected.

The conduit 18a is also connected to a conduit 18b through a two position 3 port valve 26 which is movable by a pedal 27 between a first position in which the conduits 18a and 18b are connected and a second position in which the line 18b is vented, the conduit 18a being blanked off.

The conduit 18b is connected to the conduit 22 by a 3 port two position valve 20 which is biased toward the position shown by a spring 32. In this position the conduit 22 is vented and flow through the line 18 is prevented. The valve 20 is movable against the spring 32 by a solenoid 33 which is energised by an electric circuit 21. The circuit includes a switch 19 which is connected to mechanical retaining means such as the detent 30 so that in the normal position of the valve 16 the switch 19 is open and movement of the valve 16 to its other position closes the switch 19 to energize the solenoid 33 and move the valve 20. The conduit 18b is then connected to the conduit 22.

The conduit 22 is connected through a rotatable coupling 10 located between the super structure S and undercarriage U to an actuator in the form of a cylinder assembly 24. The cylinder assembly 24 comprises a piston 23 biased in one direction by a spring 25. The piston 23 is connected to a brake assembly 2 which is arranged to engage a convenient member of the transmission T to prevent movement of the transmission T. The brake assembly 2 is biased so that it engages the transmission and pressure in conduit 22 is required to release the brake 2.

The operation of the system will now be described. In the condition shown in FIG. 2 the braking system is conditioned for work, i.e. all the brakes are engaged and valves 11, 16 and 20 are in the normal, or first, position. Air is supplied through the conduit 18a and valve 16 to conduit 9c so that the chamber 6 is pressurised to apply the brakes 1. The conduit 22 is vented by the valve 20 so that the transmission brake 2 is engaged.

If the excavator is now to be moved between work positions, the pedal 15 is depressed to move valve 11 to allow air to flow through the conduit 9b so pressurising the pilot line 31 and moving the valve 16. This maintains pressure in the line 9c. Movement of the valve 16 causes the switch 19 to close and energize the solenoid 33. The valve 20 is thus moved and allows pressurisation of the conduit 22 to release the transmission brake 2. The pedal 15 is then released to vent the line 9c and release the brake assemblies 1. The valve 16 is retained in position by the detent 30 to maintain pressurisation of the conduit 22. The excavator may thus be moved and the pedal 15 used as a conventional brake pedal.

Upon arrival at a new work location the pedal 17 is depressed to move the valve 16 into its normal position thereby allowing pressurisation of the line 9c to apply the brake assemblies 1. The depression of pedal 17 allows the switch 19 to open and so de-energize the solenoid 33. The spring 33 moves the valve 20 to vent the conduit 22 and allow the brake 2 to be applied.

If during movement between work positions the brake assemblies 1 should fail, depression of the pedal 27 will vent the conduit 18b and 22 and so allow the brake 2 to be applied, thereby providing an emergency braking facility.

What we claim is:

1. A fluid pressure operated braking system for a wheeled vehicle comprising a first braking circuit for wheel brakes, a second braking circuit for a transmission brake and means for controlling operation of said first and second braking circuits, said means including a first valve means connected to a source of fluid pressure and movable between first and second operating positions, a second valve means movable between first and second operation positions, a first conduit for conducting fluid pressure connecting said first and second valve means, a second conduit separately connected to said source of fluid pressure and to said second valve means, means connecting said second valve means to said first braking circuit in said second position of said second valve means, means connecting said second conduit to said first braking circuit in said first position of said second valve means and to said second braking circuit in said second position of said second valve means, means responsive to operation of said first valve means for moving said second valve means between said first and said second positions, means responsive to movement of said second valve means for connecting said second conduit to said second braking conduit.

2. A braking system according to claim 1 including third valve means movable between said first and second positions to control supply of fluid pressure to said second brake circuit, and means for effecting movement of said third valve in response to movement of said second valve.

3. A braking system according to claim 2 including means operable in said first position of said first, second and third valves means for applying brakes operable by said first and second braking circuits, and means, operable in said second position of said second valve means for releasing said brakes operable by said second braking circuit, and for selectively applying and releasing said brakes operable by said first braking circuit in response to movement of said first valve means.

4. A braking system according to claim 2 wherein the third valve is connected by a third conduit to the second conduit.

5. A braking system according to claim 2 wherein the third valve is moved by means of a solenoid and the second valve includes a switch which is closed to energise the solenoid upon movement of the second valve.

6. A braking system according to claim 5 wherein movement of the second valve from the first position to the second position closes said switch.

7. A braking system according to claim 6 wherein fluid actuators are arranged to apply the brakes of the first braking circuit and to oppose the bias of the brake of said second braking circuit.

8. A braking system according to claim 7 wherein the third valve is in a position to vent the actuator opposing the bias of the brake when the second valve is in the first position.

9. A braking system according to claim 2 in which a fourth valve operable in emergency to vent the said second brake circuit is provided in a conduit supplying the third valve.

10. A braking system according to claim 9 in which the said first, second, third and fourth valves are incorporated in a pneumatic circuit and at least one of the brakes is hydraulically actuated by a pneumatically operated actuator.

11. A braking system according to claim 7 in which the fourth valve is moved to the second position by means of a third foot pedal and to the first position by resilient means.

12. A braking system according to claim 2 in which the third valve is moved to the second position by means of a solenoid and moved to the first position by resilient means.

13. A braking system according to claim 1 wherein the brakes associated with the first braking circuit are applied by the application of a positive pressure and the brake associated with the second braking circuit are applied by resilient means, positive pressure being applied to release the brake.

14. A braking system according to claim 1 in which the first valve when in the first position is vented and when in the second position is connected to a source of fluid pressure.

15. A braking system according to claim 1 in which a pilot line is provided between the first conduit and the second valve for moving the second valve into the second position when the first valve is connected to the source of fluid pressure.

16. A braking system according to claim 1 in which the second valve when in the second position connects the first conduit with the first braking circuit.

17. A braking system according to claim 1 in which the second valve is retained in the second position by mechanical retaining means.

18. A braking system according to claim 1 in which the first valve is moved to the second position by means of a first foot pedal and to the first position by resilient means.

19. A braking system according to claim 1 in which the second valve is moved to the second position by fluid pressure and to the first position by means of a second foot pedal.

* * * * *

UNITED STATES PATENT OFFICE
CERTIFICATE OF CORRECTION

Patent No. 4,068,899        Dated January 17, 1978

Inventor(s) Gert Nolte and Wolfgang Dittberner

It is certified that error appears in the above-identified patent and that said Letters Patent are hereby corrected as shown below:

Claim 11, line 1, change "7" to --9--.

Signed and Sealed this

Twenty-fifth Day of April 1978

[SEAL]

Attest:

RUTH C. MASON
*Attesting Officer*

LUTRELLE F. PARKER
*Acting Commissioner of Patents and Trademarks*